United States Patent Office.

ANN AUGUSTA MARSH, OF FRANKFORT, MICHIGAN.

Letters Patent No. 106,846, dated August 30, 1870.

IMPROVED MEDICAL COMPOUND.

The Schedule referred to in these Letters Patent and making part of the same.

I, ANN AUGUSTA MARSH, of Frankfort, county of Benzie and State of Michigan, have invented a Compound, called Nervino, for the cure of nervous and febrile diseases.

The nature of my invention consists in uniting muriate of ammonia, alcohol, oil of spearmint, and rain-water, in the following proportions, viz.: Muriate of ammonia, one ounce; alcohol, twelve fluid ounces; rain water, thirty-two fluid ounces; oil of spearmint, one dram.

Claim.

I claim as my invention—

The manufacture or preparation of a compound denominated Nervino, of the ingredients, in the proportions, and for the purposes set forth.

ANN AUGUSTA MARSH.

Witnesses:
W. H. MARSH,
H. K. VOORHEIS.